(12) United States Patent
Höglund et al.

(10) Patent No.: US 11,096,221 B2
(45) Date of Patent: Aug. 17, 2021

(54) TRANSMISSION OF EARLY DATA IN MESSAGE 3 (MSG3) VIA A DUAL GRANT

(71) Applicant: Telefonaktiebolaget LM Ericsson (publ), Stockholm (SE)

(72) Inventors: Andreas Höglund, Solna (SE); Johan Bergman, Stockholm (SE); Olof Liberg, Stockholm (SE); Magnus Stattin, Upplands Väsby (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 16/500,479

(22) PCT Filed: Apr. 3, 2018

(86) PCT No.: PCT/IB2018/052289
§ 371 (c)(1),
(2) Date: Oct. 3, 2019

(87) PCT Pub. No.: WO2018/185654
PCT Pub. Date: Oct. 11, 2018

(65) Prior Publication Data
US 2020/0037368 A1 Jan. 30, 2020

Related U.S. Application Data

(60) Provisional application No. 62/480,719, filed on Apr. 3, 2017.

(51) Int. Cl.
*H04W 74/08* (2009.01)
*H04W 72/14* (2009.01)
*H04W 72/12* (2009.01)

(52) U.S. Cl.
CPC .... *H04W 74/0833* (2013.01); *H04W 72/1294* (2013.01); *H04W 72/14* (2013.01)

(58) Field of Classification Search
CPC .......... H04W 74/0833; H04W 74/008; H04W 72/14; H04W 72/1289; H04W 72/1294
See application file for complete search history.

(56) References Cited

U.S. PATENT DOCUMENTS

| 2015/0282213 | A1* | 10/2015 | Sun | H04W 74/0833 370/329 |
| 2016/0227582 | A1* | 8/2016 | Vajapeyam | H04L 67/12 |

(Continued)

FOREIGN PATENT DOCUMENTS

| EP | 2 265 077 A1 | 12/2010 |
| WO | 2016 025899 A1 | 2/2016 |

OTHER PUBLICATIONS

3GPP TS 36.300 v14.2.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)—Mar. 2017.

(Continued)

*Primary Examiner* — Min Jung
(74) *Attorney, Agent, or Firm* — Baker Botts, LLP

(57) ABSTRACT

According to certain embodiments, a method is disclosed for use in a network node. The method comprises receiving a random access preamble from a wireless device, scheduling a grant of a first uplink transmission opportunity and a second uplink transmission opportunity, and sending a random access response to the wireless device. The random access response indicates information associated with the grant of the first uplink transmission opportunity and the second uplink transmission opportunity. The method further (Continued)

comprises receiving data from the wireless device via the first uplink transmission opportunity or the second uplink transmission opportunity.

24 Claims, 14 Drawing Sheets

(56) References Cited

U.S. PATENT DOCUMENTS

| | | | | |
|---|---|---|---|---|
| 2017/0223728 | A1* | 8/2017 | Luo | H04W 72/14 |
| 2017/0332410 | A1* | 11/2017 | Babaei | H04B 17/318 |
| 2018/0027590 | A1* | 1/2018 | Yerramalli | H04W 76/28 |
| | | | | 370/328 |
| 2018/0049073 | A1* | 2/2018 | Dinan | H04W 4/70 |
| 2018/0049193 | A1* | 2/2018 | Belleschi | H04W 72/0446 |
| 2018/0324869 | A1* | 11/2018 | Phuyal | H04W 72/14 |
| 2019/0349779 | A1* | 11/2019 | Li | H04W 72/1289 |
| 2019/0364605 | A1* | 11/2019 | Loehr | H04W 74/0833 |
| 2020/0383134 | A1* | 12/2020 | Tirronen | H04W 72/1263 |

OTHER PUBLICATIONS

3GPP TS 36.321 v14.2.0; Technical Specification; 3rd Generation Partnership Project; Technical Specification Group Radio Access Network; Evolved Universal Terrestrial Radio Access (E-UTRA); Medium Access Control (MAC) protocol specification (Release 14)—Mar. 2017.

3GPP TS 36.331 v14.2.0; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Mar. 2017.

3GPP TSG-RAN WG2 #66; San Francisco, USA; Source: Ericsson; Title: Combined AS/NAS for control plane activation (R2-092956)—May 4-8, 2009.

3GPP TSG RAN1#88bis; Spokane, US; Title: Early data transmission for MTC; Source: Ericsson (R1-1705197)—Apr. 3-7, 2017.

PCT Notification of Transmittal of the International Search Report and the Written Opinion of the International Searching Authority, or the Declaration for International application No. PCT/IB2018/052289—Jun. 15, 2018.

3GPP TS 36.213 v14.0.0; Technical Specification; 3rd Generation Partnership Project; Technical Specification Group Radio Access Network; Evolved Universal Terrestrial Radio Access (E-UTRA); Physical layer procedures (Release 14) (due to size, this reference has been split into six parts)—Sep. 2016.

* cited by examiner

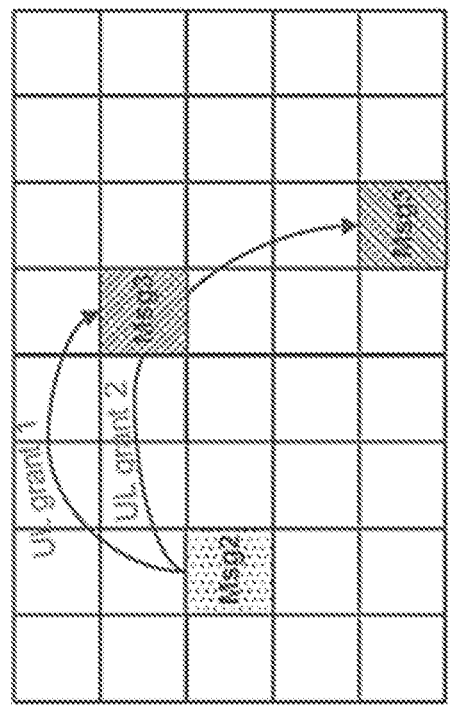
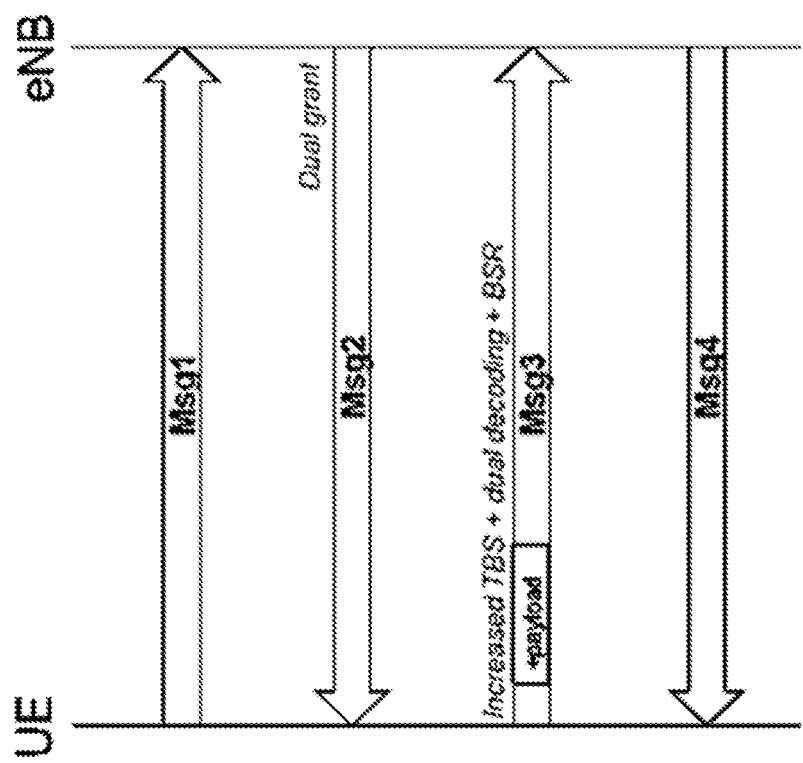
FIG. 4
FIG. 3

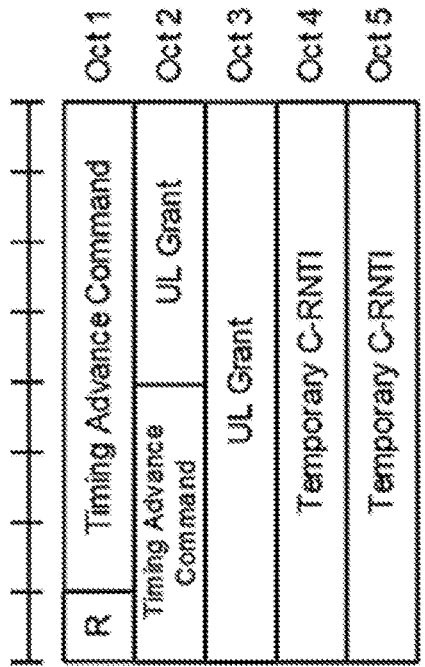
FIG. 8
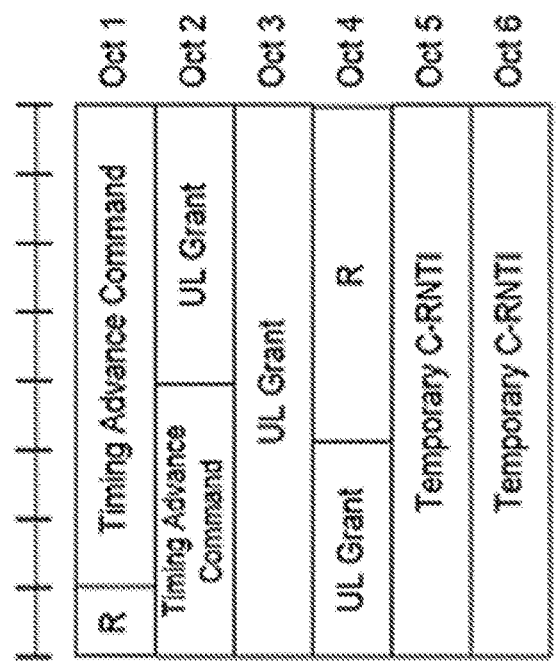
FIG. 9
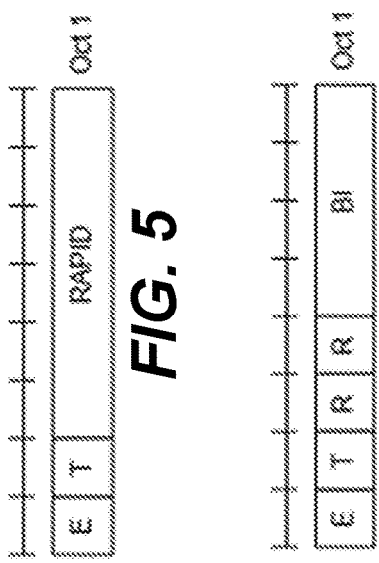
FIG. 5
FIG. 6
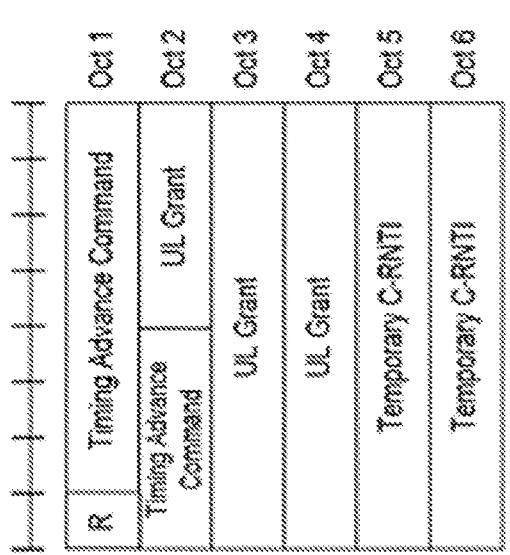
FIG. 7

FIG. 11 — E | T | D | R | BI (Oct 1)

FIG. 12 — E | T | R | D | BI (Oct 1)

FIG. 13 — Oct 1: Timing Advance Command | Oct 2: UL Grant | Oct 3: UL Grant | Oct 4: UL Grant | Oct 5: Temporary C-RNTI | Oct 6: Temporary C-RNTI

FIG. 14 — Oct 1: D | Timing Advance Command | Oct 2: Timing Advance Command | UL Grant | Oct 3: UL Grant | Oct 4: Temporary C-RNTI | Oct 5: Temporary C-RNTI

FIG. 15 — Oct 1: D | Timing Advance Command | Oct 2: Timing Advance Command | UL Grant | Oct 3: UL Grant | Oct 4: UL Grant | R | Oct 5: Temporary C-RNTI | Oct 6: Temporary C-RNTI

TRANSMISSION OF EARLY DATA IN MESSAGE 3 (MSG3) VIA A DUAL GRANT

PRIORITY

This nonprovisional application is a U.S. National Stage Filing under 35 U.S.C. § 371 of International Patent Application Serial No. PCT/IB2018/052289 filed Apr. 3, 2018 and entitled "TRANSMISSION OF EARLY DATA IN MESSAGE 3 (MSG3) VIA A DUAL GRANT" which claims priority to U.S. Provisional Patent Application No. 62/480,719 filed Apr. 3, 2017 both of which are hereby incorporated by reference in their entirety.

TECHNICAL FIELD

In general, certain embodiments of the present disclosure relate to a random access procedure in a wireless communications network. More specifically, certain embodiments relate to a random access procedure that grants multiple uplink transmission opportunities.

BACKGROUND

The Third Generation Partnership Project (3GPP) has recently undertaken a lot of work specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced bandwidth of up to 6 physical resource blocks (PRBs), and Narrowband IoT (NB-IoT) UEs providing a new radio interface (and UE categories, Cat-NB1 and Cat-NB2).

The Long Term Evolution (LTE) enhancements introduced in 3GPP Release 13,14 and 15 for MTC will be referred to herein as enhanced Machine-Type Communications (eMTC), including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC (likewise for NB-IoT). Some important differences include new physical channels, such as the physical downlink control channels, called MPDCCH in eMTC and NPDCCH in NB-IoT, and a new physical random access channel, NPRACH, for NB-IoT.

One goal of 3GPP Release 15 is to reduce UE power consumption and latency by introducing the possibility of sending data as early as possible during the Random Access procedure. For example, a new work item (WI) entitled "Even further enhanced MTC for LTE (LTE_efeMTC)" (hereinafter, "WI_eMTC") aims to address this goal with respect to eMTC enhancements. WI_eMTC provides as follows:
Support early data transmission [RAN2 lead, RAN1, RAN3]
Evaluate power consumption/latency gain and specify necessary support for DL/UL [downlink/uplink] data transmission on a dedicated resource during the Random Access procedure (after PRACH transmission and before the RRC connection setup is completed) at least in the RRC Suspend/Resume case.

As another example, a new work item entitled "Further NB-IoT enhancements (NB_IOTfenh)" (hereinafter, "WI_NBIOT") aims to address this goal with respect to NB-IoT enhancements. WI_NBIOT provides as follows:
Evaluate power consumption/latency gain and specify necessary support for DL/UL data transmission on a dedicated resource during the Random Access procedure after NPRACH transmission and before the RRC connection setup is completed. [RAN2, RAN1, RAN3]

As used herein, such a feature, where data can be sent during Random Access procedure, shall be referred to as "early data" feature, meaning that data can be sent earlier when compared to current LTE specifications (that is, after RRC connection setup or resume has been completed).

The currently specified random access and connection control procedures can be found in the following 3GPP Technical Specifications (TS): 3GPP TS 36.321, "MAC protocol specification", v14.2.0, March 2017 [TS36.321] and 3GPP TS 36.331, "RRC protocol specification"; v14.2.0, March 2017 [TS36.331]. The contention based Random Access (RA) procedure can be found in 3GPP TS 36.300, "E-UTRA and E-UTRAN; Overall description; Stage 2", v14.2.0, March 2017 [TS36.300]. This procedure is illustrated in FIG. 1 of the present disclosure. The messages in FIG. 1 are commonly referred to as message 1 (msg1) through message 4 (msg4). The structure of medium access control (MAC) layer protocol data units (PDUs) are defined in 3GPP TS 36.213, "Physical layer procedures", v14 [TS36.213] and are also referenced to herein. The structure of the grant included in the MAC random access response (RAR) is defined in TS36.213.

Currently, in LTE, it is not possible to send uplink or downlink data before the random access procedure has been completed, that is, in the contention based procedure, not before message 4 has been sent by the eNB and decoded by the UE.

SUMMARY

Certain challenges can be envisioned when implementing the early data feature discussed above. For example, the UE uses the random access procedure to obtain dedicated network resources and make its identity known to the evolved nodeB (eNB), which means that the eNB does not know the exact UE identity prior to the random access procedure. Also, the eNB doesn't know the capabilities of the UE. Thus, a method for sending early data cannot rely on the eNB knowing which type of UEs have initiated the random access procedure and if the UEs support early data transmission or not. Furthermore, UEs that do not support early data transmission, such as UEs that follow 3GPP Release 13 and 14, are not able to comprehend any new formats. Therefore, the messages and Random Access procedure can only be changed in a backwards compatible manner.

There is proposed herein a backwards-compatible method where the network (eNB) schedules uplink data already in msg 3, (i.e., gives a grant with larger data allocation compared to legacy specifications), by sending a dual grant in msg 2 (MAC Random Access Response message), or an extended alternative of msg2, so that both legacy (i.e., pre-Rel15) UEs not supporting early data and Rel-15 UEs supporting the early data feature can be scheduled. The newly introduced second uplink (UL) grant disclosed herein is only interpreted by a UE capable of early data, and such UE will autonomously select which of the two UL grants to use for the transmission of msg3, e.g., based on the size of its UL buffer. A trigger or a flag can be sent from the network to indicate the use of a dual UL grant to UEs supporting the early data feature. UEs not supporting this feature (e.g., Release 13 and 14 UEs) are not affected and they see a message according to the legacy specifications.

According to certain embodiments, a network node comprises processing circuitry and logic. The logic, when executed by the processing circuitry, causes the network node to receive a random access preamble from a wireless device, schedule a grant of a first uplink transmission opportunity and a second uplink transmission opportunity, and send a random access response to the wireless device. The random access response indicates information associated with the grant of the first uplink transmission opportunity and the second uplink transmission opportunity. The network node is further configured to receive data from the wireless device via the first uplink transmission opportunity or the second uplink transmission opportunity.

According to certain embodiments, a method implemented in a network node comprises receiving a random access preamble from a wireless device, scheduling a grant of a first uplink transmission opportunity and a second uplink transmission opportunity, and sending a random access response to the wireless device. The random access response indicates information associated with the grant of the first uplink transmission opportunity and the second uplink transmission opportunity. The method further comprises receiving data from the wireless device via the first uplink transmission opportunity or the second uplink transmission opportunity.

Certain embodiments of the above-described network node and/or method implemented in a network node may include various additional features, such as any one or more of the examples that follow:

In certain embodiments, the random access response indicates a transport block size for the second uplink transmission opportunity.

In certain embodiments, the random access response is backward compatible with an LTE random access procedure according to 3GPP Release 14 or earlier.

In certain embodiments, the random access response is formatted such that a wireless device interpreting the random access response according to 3GPP Release 14 or earlier ignores the grant of the second uplink transmission opportunity.

In certain embodiments, the second uplink transmission opportunity allows more uplink data to be transmitted prior to completing a random access procedure than the first uplink transmission opportunity.

In certain embodiments, the second uplink transmission opportunity allows more uplink data to be transmitted in message 3 of the random access procedure than the first uplink transmission opportunity.

In certain embodiments, receiving the data from the wireless device comprises receiving the data via the second uplink transmission opportunity before the random access procedure has completed.

In certain embodiments, prior to scheduling the first uplink transmission opportunity and the second uplink transmission opportunity, a determination is made whether or not to grant both the first uplink transmission opportunity and the second uplink transmission opportunity.

In certain embodiments, the random access response comprises an explicit indication that the second uplink transmission opportunity has been granted.

In certain embodiments, the random access response comprises the grant of the first uplink transmission opportunity and an indication that the grant of the second uplink transmission opportunity is being sent in another message.

In certain embodiments, the random access response comprises the grant of the first uplink transmission opportunity and the second uplink transmission opportunity embedded in the random access response.

In certain embodiments, wireless resources scheduled for the first uplink transmission opportunity overlap wireless resources scheduled for the second uplink transmission opportunity.

According to certain embodiments, a wireless device comprises processing circuitry and logic. The logic, when executed by the processing circuitry, causes the wireless device to send a random access preamble to a network node and receive a random access response from the network node. The random access response indicates information associated with a grant of a first uplink transmission opportunity and a second uplink transmission opportunity. The wireless device is further configured to select the first uplink transmission opportunity or the second uplink transmission opportunity and transmit data to the network node using the selected uplink transmission opportunity.

According to certain embodiments, a method is implemented in a wireless device comprises sending a random access preamble to a network node and receiving a random access response from the network node. The random access response indicates information associated with a grant of a first uplink transmission opportunity and a second uplink transmission opportunity. The method further comprises selecting the first uplink transmission opportunity or the second uplink transmission opportunity and transmitting data to the network node using the selected uplink transmission opportunity.

Certain embodiments of the above-described wireless device and/or method implemented in a wireless device may include various additional features, such as any one or more of the examples that follow:

In certain embodiments, the random access response indicates a transport block size for the second uplink transmission opportunity.

In certain embodiments, the random access response is backward compatible with an LTE random access procedure according to 3GPP Release 14 or earlier.

In certain embodiments, the wireless device/method is configured to select the grant of the first uplink transmission opportunity and ignore the grant of the second uplink opportunity when the wireless device interprets the random access response according to 3GPP Release 14 or earlier.

In certain embodiments, the second uplink transmission opportunity allows more uplink data to be transmitted prior to completing a random access procedure than the first uplink transmission opportunity and transmitting the data to the network node comprises transmitting the data via the second uplink transmission opportunity before the random access procedure has completed.

In certain embodiments, the second uplink transmission opportunity allows more uplink data to be transmitted in message 3 of the random access procedure than the first uplink transmission opportunity and transmitting the data to the network node comprises transmitting the data via the second uplink transmission opportunity in message 3 of the random access procedure.

In certain embodiments, the random access response comprises an explicit indication that the second uplink transmission opportunity has been granted.

In certain embodiments, the information associated with the grant of the second uplink transmission opportunity that is received in the random access response comprises an indication that the grant of the second uplink is being sent in another message.

In certain embodiments, the information associated with the grant of the second uplink transmission opportunity that is received in the random access response comprises the grant of the second uplink embedded in the random access response.

In certain embodiments, the information associated with the grant of the first uplink transmission opportunity and the second uplink transmission opportunity indicates that wireless resources scheduled for the first uplink transmission opportunity overlap wireless resources scheduled for the second uplink transmission opportunity.

According to certain embodiments, a computer program comprises computer-readable instructions for causing a programmable processor to perform any of the above-described methods. As an example, certain computer programs may perform the methods described as being performed by a network node. As another example, certain computer programs may perform the methods described as being performed by a wireless device. According to certain embodiments, a computer program product comprises a computer-readable medium storing the computer program.

Certain embodiments of the present disclosure may provide one or more technical advantages. For example, certain embodiments may allow use of early data in a backwards-compatible fashion in msg3. The dual grant-solution is backwards compatible so that the new UEs (e.g., Rel-15 onwards) would be able to use the information embedded in the RAR message and/or UL grant, while UEs not supporting the early data feature would disregard the provided additional information to support the feature.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION

FIG. 3 is a signal flow diagram illustrating an example of a random access procedure using a dual grant, in accordance with certain embodiments.

FIG. 4 is a time-frequency diagram illustrating an example of granting separate time and frequency resources for a first uplink transmission opportunity and a second uplink transmission opportunity, in accordance with certain embodiments.

FIGS. 5-10 are message format diagrams according to current 3GPP specifications.

FIG. 11-17 are message format diagrams illustrating examples of alternative message formats in accordance with certain embodiments of the present disclosure.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

Figure 2A:
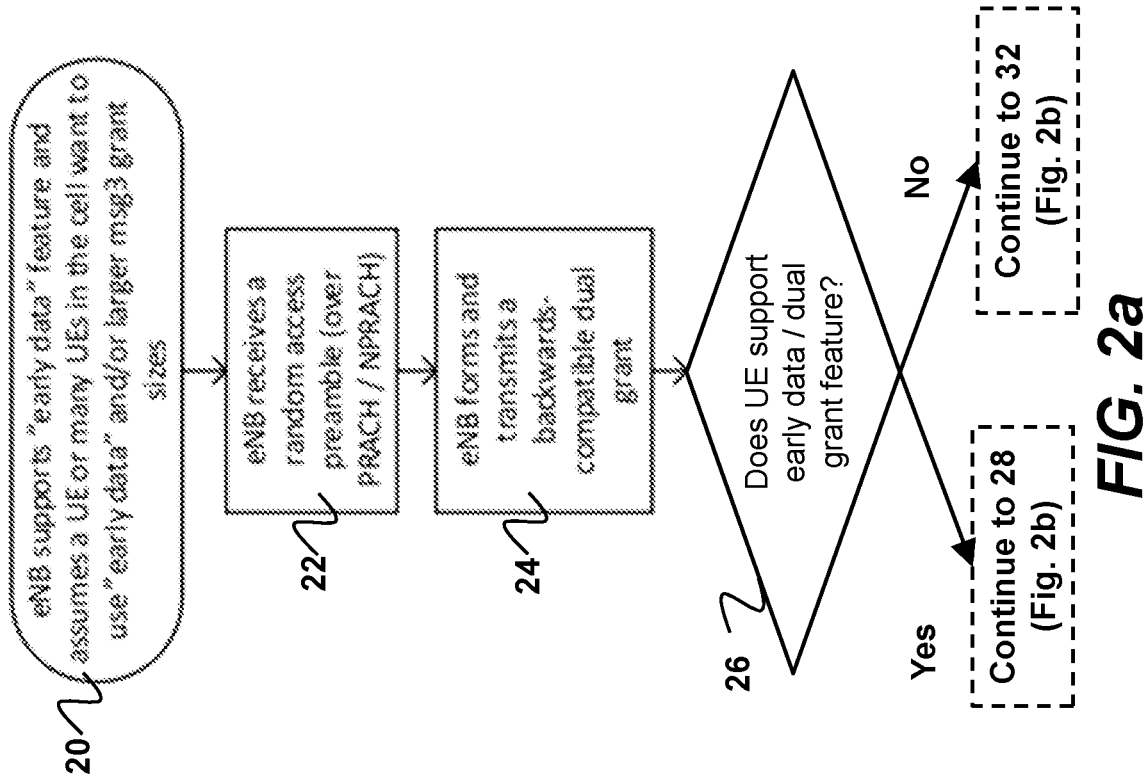
FIG. 2 is a flow chart illustrating an example of a method that supports a backward compatible dual grant during a random access procedure, in accordance with certain embodiments.
Figure 2B:
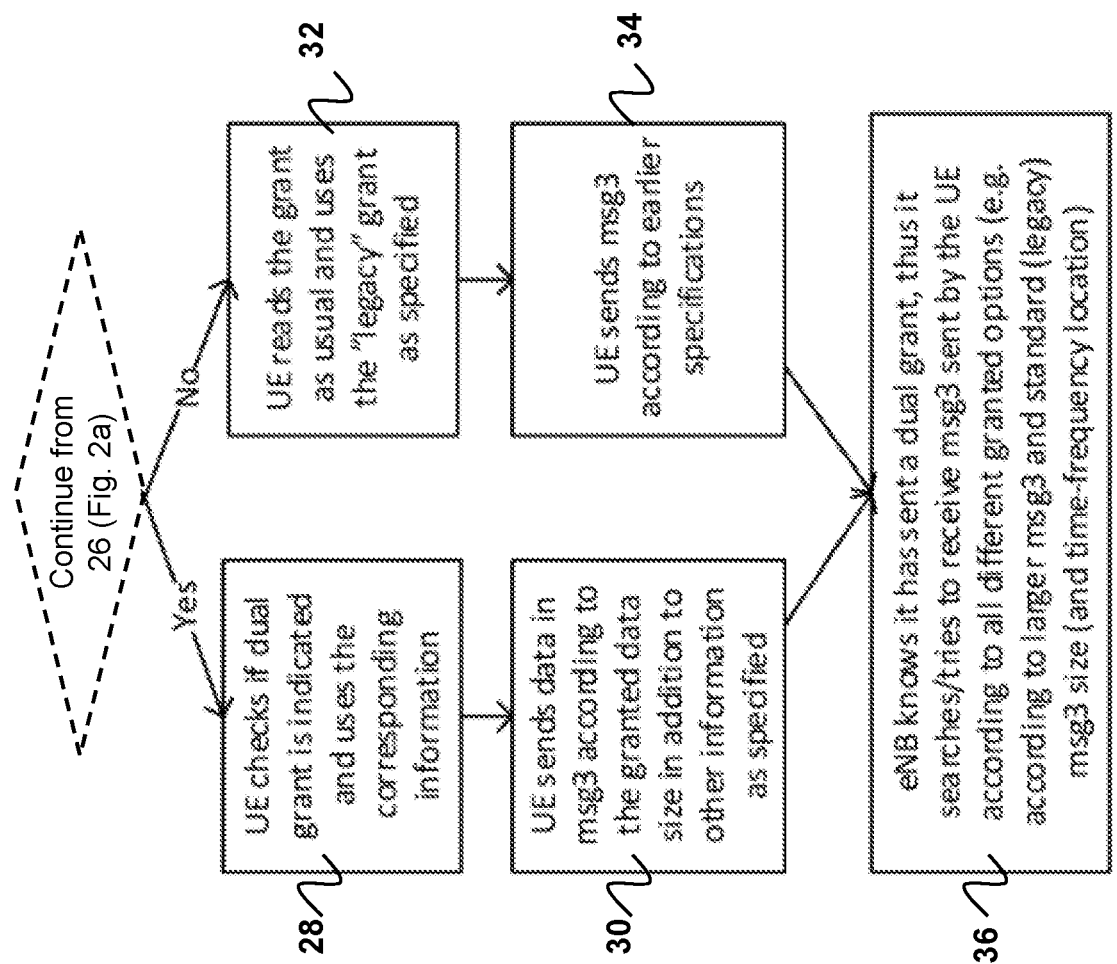

FIG. 2 is a flow chart illustrating an example of a method that supports a backward compatible dual grant during a random access procedure, in accordance with certain embodiments. With respect to step 20 of FIG. 2, it is assumed that the eNB does not know if a UE supports user data in msg3 or not, but the eNB has a way of deciding that a larger msg3 grant could be used. The method on how the eNB detects that UEs support the early data feature or makes the assumption that UEs support the early data feature can be left up to eNB implementation and does not need to be specified.

At step 22, the eNB receives a random access preamble from a UE. In some embodiments, the random access preamble is received over the physical random access channel (PRACH) or the narrowband PRACH (NPRACH). At step 24, the eNB forms and transmits a backwards-compatible dual grant. For example, the eNB sends a first UL grant in RAR which is backwards compatible, but where either the UL grant or the RAR message contains an indication that a larger second UL grant for msg3 (i.e., containing user plane data) is also provided and can be used for transmission. In some embodiments, such an indication can be omitted and the UE can deduce whether this is possible from the presence of a second UL grant itself. The actual first UL grant size is typically kept small (as legacy), and the possibility to send larger msg3 is indicated by an indicator for second UL grant provided, e.g., in:

a. Either in the UL grant itself, by using some bit/parameter combination in a backwards compatible way b. Or in the MAC Random Access Response message by using existing reserved bits ('R' in specification), a special radio network temporary identifier (RNTI) range, or other means.

i. The reserved 'R'-bits in the MAC header and/or in the RAR itself can be used.

ii. As an example of the RNTI, a certain range of the Temporary C-RNTIs (cell RNTIs) provided in RAR could be used for this indication (and the range could be indicated in System Information Broadcast).

c. The presence of a new Random Access Preamble IDentifier (RAPID), further described below.

At step 26, the backwards-compatible grant is received by the UE and the UE determines if it supports the early data/dual grant feature. If the UE supports the early data/dual grant feature, the method proceeds to step 28. At step 28, if the UE wants to send data in msg3, it interprets the message accordingly and receives a second UL grant for larger msg3 and can include user data in the message. The UE interprets the received message according to future (e.g., 3GPP Rel-15) specifications. The UE then proceeds to step 30 to transmit msg3 using the provided larger second UL grant for uplink data, providing user plane data with radio resource control (RRC) and/or non access stratum (NAS) protocol message(s) and the UE identifier. For example, the user plane data may be multiplexed with RRC or NAS messages or carried inside the NAS message. The method then proceeds to step 36 where the eNB performs detection based on the legacy first UL grant and the larger second UL grant because the eNB cannot know in advance if the UE supports the early data feature or not.

If at step 26 the UE does not support the larger msg3 or early data in msg3, the method proceeds to step 32 where the UE receives the RAR message containing a first UL grant for msg3 looking like a legacy message type. Thus, such UEs operate as if the feature was not in use. (That is, according to earlier specifications, for example v14.2. of TS36.321). The UE then proceeds to step 34 to transmit msg3 using the first UL grant, i.e., as in Release 13 or 14, or if the early data feature is not supported, sending a transmission containing radio resource control (RRC) and/or non access stratum (NAS) protocol message(s) and the UE identifier. The method then proceeds to step 36 where the eNB performs detection based on the legacy first UL grant and the larger second UL grant because the eNB cannot know in advance if the UE supports the early data feature or not.

FIG. 3 is a signal flow diagram illustrating an example of a random access procedure using a dual grant, in accordance with certain embodiments.

Step 1: Msg1 reception and eNB decision on dual grant

Disclosed herein is an explanation, and use, of a dual grant in msg2, the exact method on how eNB would decide when to use such dual grant, and the size of the second UL grant may vary depending on implementation. Some potential methods include eNB making the dual grant decision based on:
- typical UE capabilities seen previously in the cell
- path-loss estimated from the random access preamble transmission
- partitioning the random access preamble space, i.e., of (N)PRACH resources, and using specific preambles to indicate support for the early data feature.
- Extension of existing preamble space, either by addition of more preambles or time-/frequency-coding of existing ones as an overlay (e.g., transmitting on multiple tones or using a different f-hopping pattern for NB-IoT).
- Coverage Enhancement level used by the UE, i.e., the (N)PRACH resource selected by the UE.
- The size of the second UL grant, could be based on e.g., the maximum number of bits that could reliably be transmitted in msg3 based on the estimation of the channel from the reception of msg1.
- Using the dual grant could be depend on the possibility to provide a larger second UL grant based the estimation of the channel from the reception of msg1.

As the eNB does not know the UE identity or capability, it makes an assumption that the UE might support early data and provide dual grant as exemplified above. If the eNB thinks no UEs support early data, it continues to provide UL grants like in legacy networks. In one embodiment the eNB can always provide a dual grant, and if the second UL grant is at a later point in time, the eNB can reuse/free-up these resources if it sees that the UE uses the first UL grant (see FIG. 4 for an example of granting the first UL time and frequency resources that are separate from the time and frequency resources granted to the second UL).

This can be left up to implementation.

Step 2: Transmission of msg2 including the dual grant

When eNB assumes the UE support and want to use early data, a dual grant is provided to the UE.

Indication of early data:

The following list of embodiments are ways in which the indication of presence of dual grant (i.e., use of the early data feature) can be indicated using the legacy RAR formats and signalling. (Subheader and RAR formats from MAC specification TS36.321 are shown in FIGS. 5-10 for reference):
- In one embodiment the dual grant is indicated using the "R" bit in the MAC header for RAR by setting a "R" bit to one. This can be done using either of the "R" bits in the Backoff Indicator (BI) subheader. See examples in FIGS. 11-12. In the BI subheader the backoff value can be set to zero ms (BI index 0) in order to avoid UEs to actually using backoff in subsequent random access attempts [TS36.321].
- In one embodiment the dual grant is indicated using the "R" bit in the MAC RAR by setting "R" bit to one. See examples in FIGS. 13-15.
- For NB-IoT, in one embodiment the "R" bits between the "UL grant" and "Temporary C-RNTI" fields are used to indicate the dual grant. See example in FIG. 16.
- In one embodiment the TC-RNTI space is divided so that certain range of the TC-RNTIs are used to indicate presence of dual grant. The TC-RNTI range is defined in the System Information (SI).
- The use for the early data feature is implicit from the presence of a second UL grant. (Note that the use of an explicit indicator is making the UE procedure and processing less demanding but is not always strictly required. That is, using the explicit indication can provide gains in terms of power and resource consumption).
- The use of an extended RAR window and/or a second MAC random access (RA) response message PDU in the RAR window.
- A new RAPID and/or a new RAR format and/or an extension of the MAC RA response message PDU.
- The use of the early data feature is indicated in System Information (SI) broadcast.
- The use of the early data feature is pre-defined in the standard.
- The use of the early data feature is indicated in dedicated RRC signaling (note that this would enable the feature only in RRC_CONNECTED mode which is less useful, but it could potentially be combined with any of the other options).
- It can be indicated in the downlink control information (DCI) of the physical downlink control channel (PDCCH)/narrowband PDDCH (NPDCCH) scheduling of msg 2.

It is also possible to use combination of the above. For example, using both BI subheader "R" bits and the MAC RAR "R" bits in total three bits can be used.

Second UL grant for early data:

The second UL grant can be provided to the UE in any of the following embodiments (e.g., when the dual grant indication is sent):

1. Pre-defined in the specification, where the size and scheduling of the following msg3 are fixed. E.g., the above indication would dynamically per attempt indicate to the UE whether it is allowed to use this second UL grant.

2. Defined in system information, where the second UL grant would be semi-static and could be changed only through system information change 3. If multiple bits are used for dual grant indication, both alternatives (1. and 2.) can include multiple options indicated by the bit combination. E.g., if the Back off indicator is set to zero, i.e., BI-index=0, there will be a 0 ms delay introduced but the two 'R'-bits in the BI subheader can be used for this purpose. In this case the specification may include a table of different combinations, or SI indicates multiple options. For example, if two reserved 'R'-bits are used the following table could be provided in system information:

| Bit sequence: | Second UL grant: |
|---|---|
| 00 | UL grant 1 |
| 01 | UL grant 2 |
| 10 | UL grant 3 |
| 11 | UL grant 4 |

4. Defined as a new MAC subheader and MAC RAR. UEs not capable of the early data feature (e.g., Release 13 and 14 UEs) would read the subheader and MAC according to the Release 13 RAPID format. UEs supporting early data would first (possibly) note that dual grant is indicated (e.g., in "R" bit in BI subheader or system information) and read the new RAPID subheader and corresponding new RAR. For the new MAC RAR format, a new format of the actual second UL grant could also be defined. In this case the "R" bit set to indicate the early data feature would effectively indicate an UE supporting the feature should be looking for extended MAC subheader and these new RAR formats. Legacy UEs would read the legacy formats according to the Release 13 RAPID format and operate as expected per earlier specification versions.

In one embodiment UEs not capable of the early data feature (e.g., Release 13 and 14 UEs) will not be able to interpret this new RAPID format. The Release 13 RAPIDs could be put first and the new early data RAPIDs put last in the MAC RA response message PDU (for reference, see FIG. 5, which depicts TS 36.321 FIG. 6.1.5-4). See an example in FIG. 17.

RAPID is indicated using 6 bits and in case 64 preambles are used is not possible to indicate new ones. However, in all cases where less than 64 preambles are used (e.g., max 48 is used for NB-IoT, group A/B partitioning might be used, preambles in certain CE-levels may be unused etc.) the preamble indexes for unused preambles could be re-used for RAPIDs indicating the new RAR format and the second UL grant for early data.

In another embodiment RAPID subheader format for early data is the same as in legacy, but the RAPID is scrambled or transformed using a known function so that the legacy UEs would read just one RAPID subheader according to the ID of the sent preamble, and the UEs supporting the early data feature would additionally read the additional subheader with scrambled RAPID, and the corresponding MAC RAR. In this case new RAR format and/or UL grant could be defined with the necessary information for the transmission of the early data.

5. An alternative where MAC RAR PDU stays intact and when the early data indication is set the second UL grant is defined as a function of the first UL grant. E.g., the transport block size (TBS) of the second UL grant could be a multiplication of the TBS of the first grant, where the multiplication factor is either a) pre-defined in the standard, b) indicated in System Information, c) included in the 'early indication', e.g., using multiple reserved 'R'-bits, d) RRC signaling (see comment on this above). Or the second UL grant could be a certain step up in the TBS selection table compared to the first UL grant. The step could be indicated in the ways a) to c) above.

6. A new (second) MAC RA response message PDU containing the RAR with a new format containing the second UL grant. This new MAC PDU could not be read by UEs not capable of the early data feature, that is in a first embodiment it would be scrambled with a new RA-RNTI, and in a second embodiment it could be transmitted outside the Release 13 RAR window. In the first embodiment, the RA-RNTI range could for example be extended such that UEs not capable of the early data feature would not consider or even be aware of the new values (which could be communicated in system information broadcast). In the second embodiment, the RAR window could for example be extended and only the UEs capable of early data would monitor for this new MAC PDU in the extension. This could possibly be combined with embodiment 4 above. (Note that in this case it is very beneficial to have the early data indication since this would limit the processing and power consumption in the UE). In a third embodiment, when the second MAC RA response message PDU is dynamically schedule, it could be indicated in the DCI on (N)PDCCH such that it not read by UEs not capable of the early data feature.

7. As alternative of the above, a new (second) MAC RA response message PDU containing the RAR with a new format containing the second UL grant could be used by using new RA-RNTIs such that it is ensured it is decoded by UEs capable of early data but not by other UEs.

8. The new information is put into the padding area of the RA response PDU (i.e., padding in FIG. 5). An UE supporting the new feature would know to look into the padding field if the feature has been indicated e.g., using one of the options listed above. A UE not capable of the early data feature, e.g., a Release 13 or 14 UE, would ignore the area after the payload when associated subheader has 'E'-bit set to zero to indicate padding. The UEs supporting early data would disregard the first 'E'-bit set to zero in this case and read the padding area including the new information structure, e.g., a new subheader format and/or new RAR message or similar information. The second occurrence of 'E'-bit set to zero would e.g., as before, be interpreted as the subsequent byte will start to contain padding. The new information could also include index or indication to a translation function between TBS and DCI and/or an alternative DCI.

In one embodiment a new extensible sub-structure in the MAC RAR PDU is introduced, where the padding field includes subheader and payload (as explained as one alternative above). This would also have the benefit of allowing possible future extensions of the PDU.

In one embodiment, even more UL grants towards one UE could be sent simultaneously and the UE would independently choose used UL grant according to the size of uplink data in its buffer (i.e., a generalization from dual grant to multiple grant). For example, using alternative 4. above, multiple subheaders and RARs could be sent in one MAC PDU where only one indicator bit would need to be used. The UE would independently then select which of the UL grants to use in Steps 3 and 4.

Step 3. Reception of msg2

If the UE supports the early data feature, it checks the presence of a dual grant indicator and/or of a second UL grant (if it is being used). If dual grant is present, the UE autonomously selects whether to use the first or second UL grant for transmission of msg3, i.e., if it acts according to the legacy UL grant or the information conveyed in the dual grant. Such information would typically indicate larger second UL grant for msg3 and scheduling information (time/frequency/repetitions) to be used for the transmission of msg3. The UE selection would be up to UE implementation but would typically be based on the size of the UL buffer, if it would be able to fit all its data in to the second UL grant etc.

Step 4. Transmission of msg3

For the transmission of msg3, eNB can in general select to have the transmissions according to the first UL grant and the second UL grant either on overlapping time-/frequency-resources or not.

If the time-/frequency-resources are overlapping this will lead to increased processing in eNB since there are twice the number of decoding hypothesis for reception. However, there is less waste from unused radio resources in this case.

Figure 1:
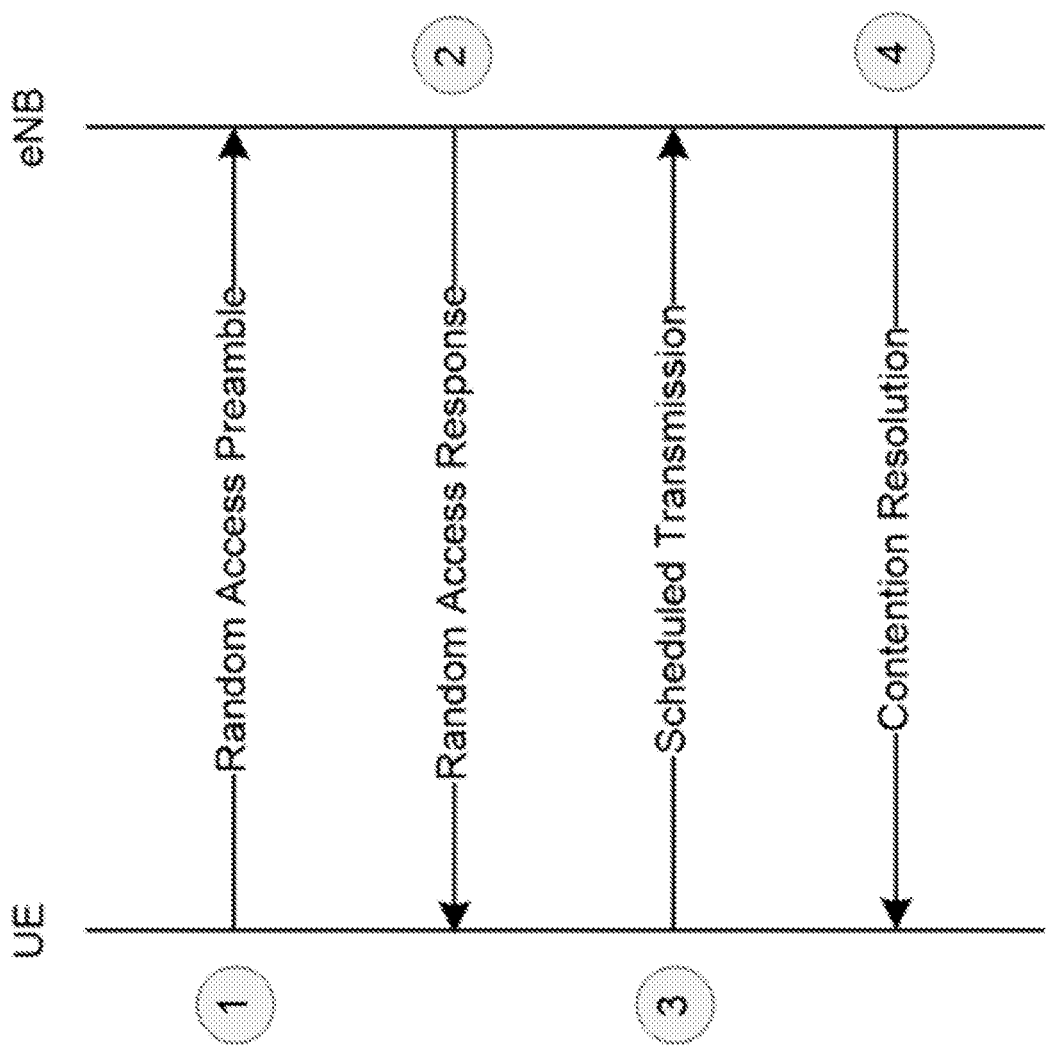
FIG. 1 is a signal flow diagram illustrating an example of a random access procedure according to 3GPP.

If the time-/frequency-resources are non-overlapping, there is no increase in eNB processing requirements for reception, however there can be a waste in radio resources, i.e., since one of the UL grants will be unused. However, there are ways to combat this, e.g., the second UL grant is at a later point in time, the eNB can reuse/free-up the resources for the second UL grant if it sees that the UE uses the first UL grant (see FIG. 1).

Note that the above choice would not have to be static but could be done dynamically at every occurrence depending on e.g., resource availability, eNB load etc.

Step 5. Reception of msg3

The eNB searches for all of the possible UL grant formats it expects UE(s) to use. In the dual grant case this means it can expect to receive either a "legacy" UL grant scheduled msg3 or a msg3 scheduled with early data as indicated using the dual grant (and if more than one possible grants/message sizes are indicated each of those), as the eNB cannot know in advance which capability the UE has.

As discussed above, FIGS. 5-10 are message format diagrams illustrating examples of message formats according to current 3GPP specifications. In particular, FIGS. 5-10 illustrate MAC subheader and RAR formats according to TS36.321 v14.2.0:

FIG. 5 illustrates an E/T/RAPID MAC subheader as depicted in FIG. 6.1.5-1 of the specification.

FIG. 6 illustrates an E/T/R/R/BI MAC subheader as depicted in FIG. 6.1.5-2 of the specification.

FIG. 7 illustrates a MAC RAR as depicted in FIG. 6.1.5-3 of the specification.

FIG. 8 illustrates MAC RAR for PRACH enhanced coverage level 2 or 3 as depicted in FIG. 6.1.5-3a of the specification.

FIG. 9 illustrates MAC RAR for NB-IoT UEs as depicted in FIG. 6.1.5-3b of the specification.

Figure 10:
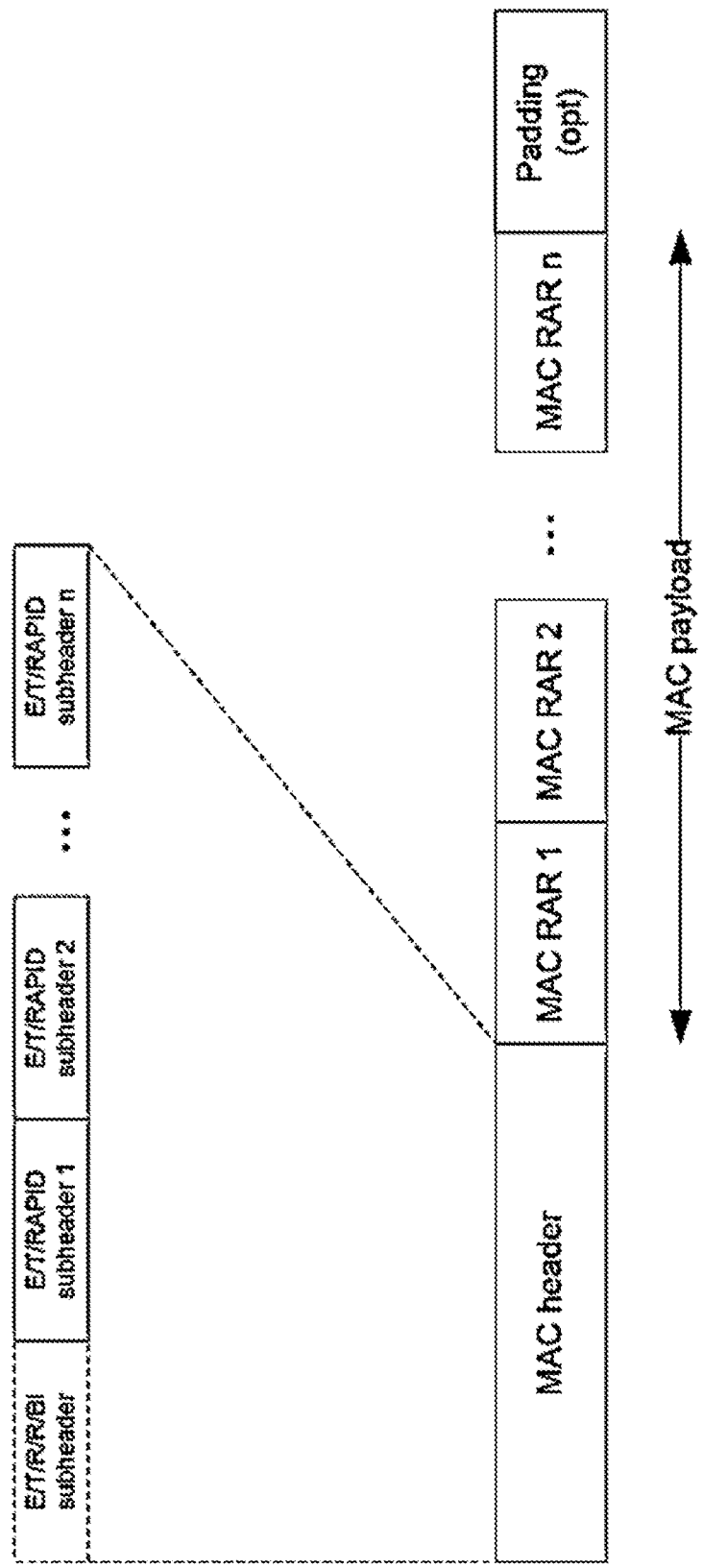

FIG. 10 illustrates an example of MAC PDU consisting of a MAC header and MAC RARs.

As discussed above, FIGS. 11-17 illustrate alternative message formats in accordance with certain embodiments of the present disclosure. In particular, FIGS. 11-12 illustrate examples of alternative definitions of BI subheader according to the invention. Specification text would additionally describe "D" as bit indicating the presence of a dual grant when the bit is set to one.

FIGS. 13-15 illustrate examples of MAC RAR (FIG. 13), MAC RAR for PRACH coverage level 2 or 3 (FIG. 14), and MAC RAR for NB-IoT (FIG. 15). "D" bit is used to indicate the presence of dual grant and early data feature by setting the bit to one.

In some embodiments the MAC RAR "D" bits and "D" bits in the BI subheader are used together. For example, the UL grant can be read according to legacy specifications, but combination of "D" bits would indicate a multiplier for the transport block size (TBS) given in the grant. The used bit combinations can be included in a table in the specifications (fixed) or signalled in system information.

Figure 16:
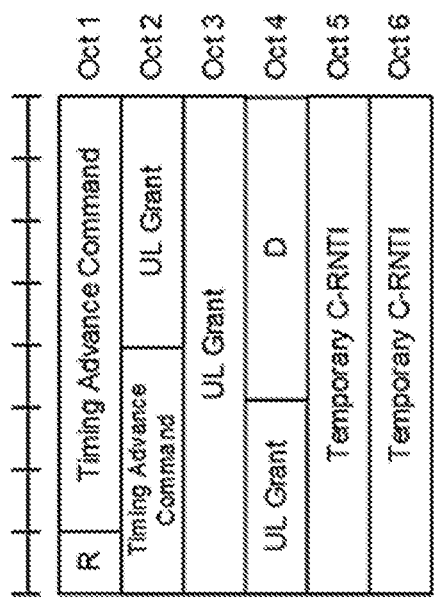

FIG. 16 provides an example of MAC RAR for NB-IoT. "D" bits are used to indicate the presence of dual grant and early data feature. Either one bit in the 5-bit field is used for indication or a combination of the bits is used. It is also possible, as above, to use multiple bits to indicate additional information, like the grant size (e.g., compared to the legacy UL grant size).

Figure 17:
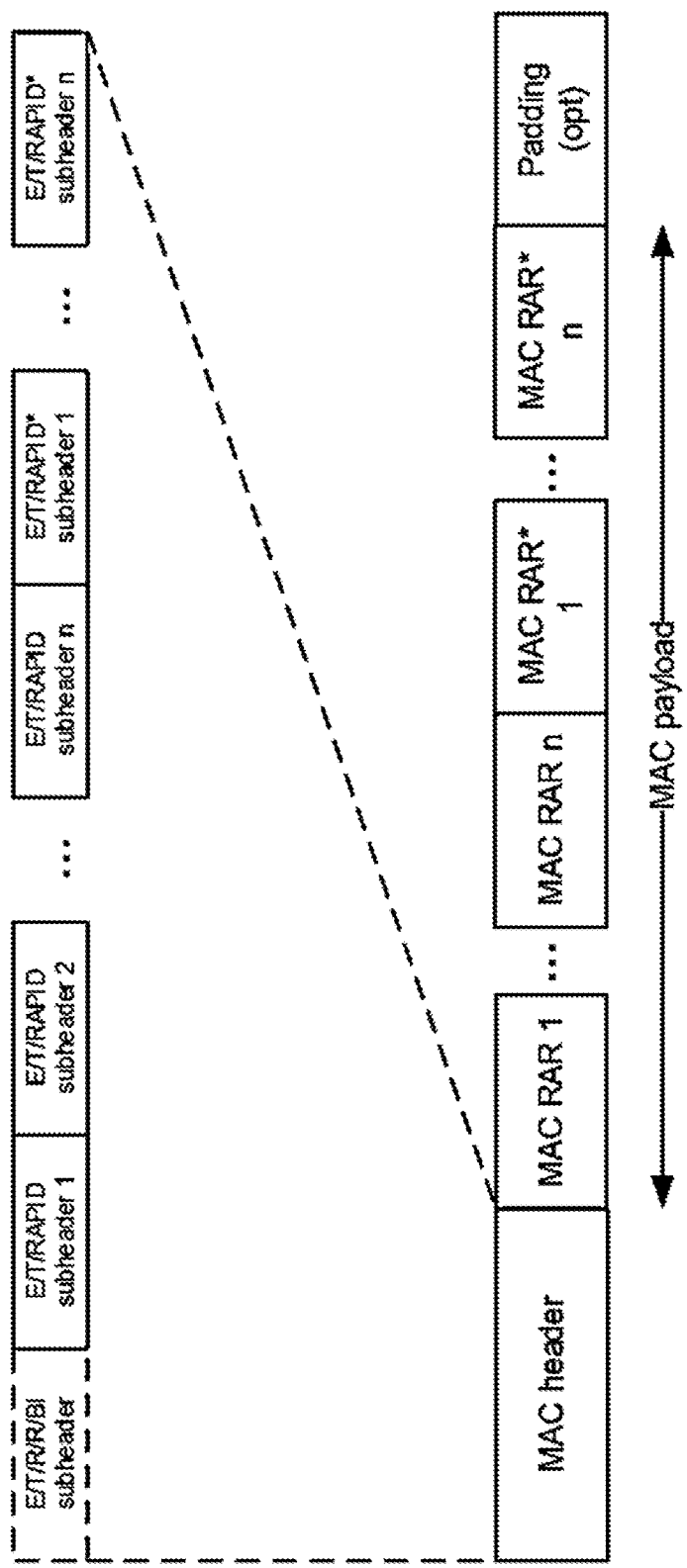

FIG. 17 illustrates an example of an extended MAC RAR PDU format. RAPID* refers to RAPID identifying early data/dual grant capable UEs. In one example the format is the same as for legacy RAPID, where UE would look for additional subheaders based on the early data/dual grant indication it has received. Likewise, RAR* refers to RAR format for early data/dual grant capable UEs. The exact definition of RAR* can be similar to as in legacy or redefined e.g., to allow more options in the UL grant.

Scheduling of Resources

At the point in time of sending RA Response, the eNB doesn't know whether the UE is of legacy or new type. Therefore, in certain embodiments, the eNB overprovisions msg3 scheduling opportunities by being prepared to receive msg3 from a UE with timing n+k1 for a legacy UE, and also with timing n+k for a new UE. The eNB therefore schedules both resources. Examples of RA Responses that may be used to overprovision msg3 scheduling opportunities are discussed below. In a first example, the eNB issues two RA Response messages after receiving a RACH preamble. An embodiment of the first example is further described below under the heading "Overprovisioning of RA Response Grants." In a second example, only one RA Response is sent from eNB. This RA Response contains a RA Response grant that can be identical to the legacy one. An embodiment of the second example is further described below under the heading "Single RA Response Grant."

First Example

Overprovisioning of RA Response Grants

As discussed above, in the first example, the eNB issues two RA Response messages after receiving a RACH preamble. The two RA Response messages include (1) a Legacy RA Response Grant and (2) a New RA Response Grant.

Legacy RA Response Grant

The Legacy RA Response Grant contains a UL grant as defined in 36.321 and 36.213. This UL grant has the legacy timing n+k1, as described in the background:

In LTE, the UE shall, according to the UL grant information in the RA response, transmit an UL-SCH transport block in the first subframe $n+_1$, $k_1 \geq 6$, if the UL delay field is set to zero where $n+k_1$ is the first available UL subframe for PUSCH transmission. The UE shall postpone the PUSCH transmission to the next available UL subframe after $n+k_1$ if the field is set to 1.

A legacy UE will decode this message and proceed to use the UL grant for msg3.

New RA Response Grant

The New RA Response Grant has a new timing of n+k. As one example this timing follows the legacy definition with 6 replaced by $k_{new}$. A new UE can decode this message and will then discard the first RA Response message. A legacy UE will not decode the second message and will therefore use the UL grant of the first RA response message.

Second Example

Single RA Response Grant

As discussed above, in the second example, only one RA Response is sent from eNB. This RA Response contains a RA Response grant that can be identical to the legacy one.

A legacy UE applies the legacy timing n+k1, as described in 36.213 and 36.321.

A new UE applies a new timing n+k. In one example $k \geq k_{new}$ if UL delay bit=0, where n+k is the first available UL subframe. If the UL delay field bit=1 the UE postpones the transmission to next available UL subframe after n+k. Thereby, the timing procedure can follow the legacy definition with 6 replaced by $k_{new}$.

Example Timing

As one example the new UE follows a timing of $k_{new}=4$ subframes, thereby reducing the signaling latency with 2 ms.

Indication of RA Response Grant Timing

In an embodiment, the network indicates the timing procedure for the RA response grant. The indication can be provided in, for instance, the system information (SI), in L1/L2 control signaling (on, e.g., PDDCH) or in a RA Response message. This indication can say that a new UE applies the shorter timing when reading the RA Response grant. Alternatively, the network can indicate to a new UE that it will transmit the new type of RA Response message, for which the UE should apply a new timing.

Sample methods

A. A method comprising:
sending a message to a UE, the message granting the UE two uplinks;
receiving data from the UE via one of the two uplinks granted to the UE.

B. The method of A wherein the message is a message 2 and the data is received in a message 3.

C. The method of A further comprising, determining whether or not to grant the UE two uplinks.

D. The method of A wherein the message granting the UE two uplinks comprises an explicit indication within the message that two uplinks have been granted.

E. The method of A further comprising determining whether or not the UE supports the grant of two uplinks.

F. A method comprising:
receiving from an eNB a message granting the UE two uplinks;
selecting one of the two uplinks to transmit data to the eNB
transmitting data to the eNB using the selected uplink.

G. The method of F wherein the message is a message 2 and the data is transmitted in a message 3.

H. The method of F wherein the message granting the two uplinks comprises an explicit indication within the message that two up links have been granted.

I. The method of F wherein wireless resources for the two uplinks are overlapping.

Figure 18:
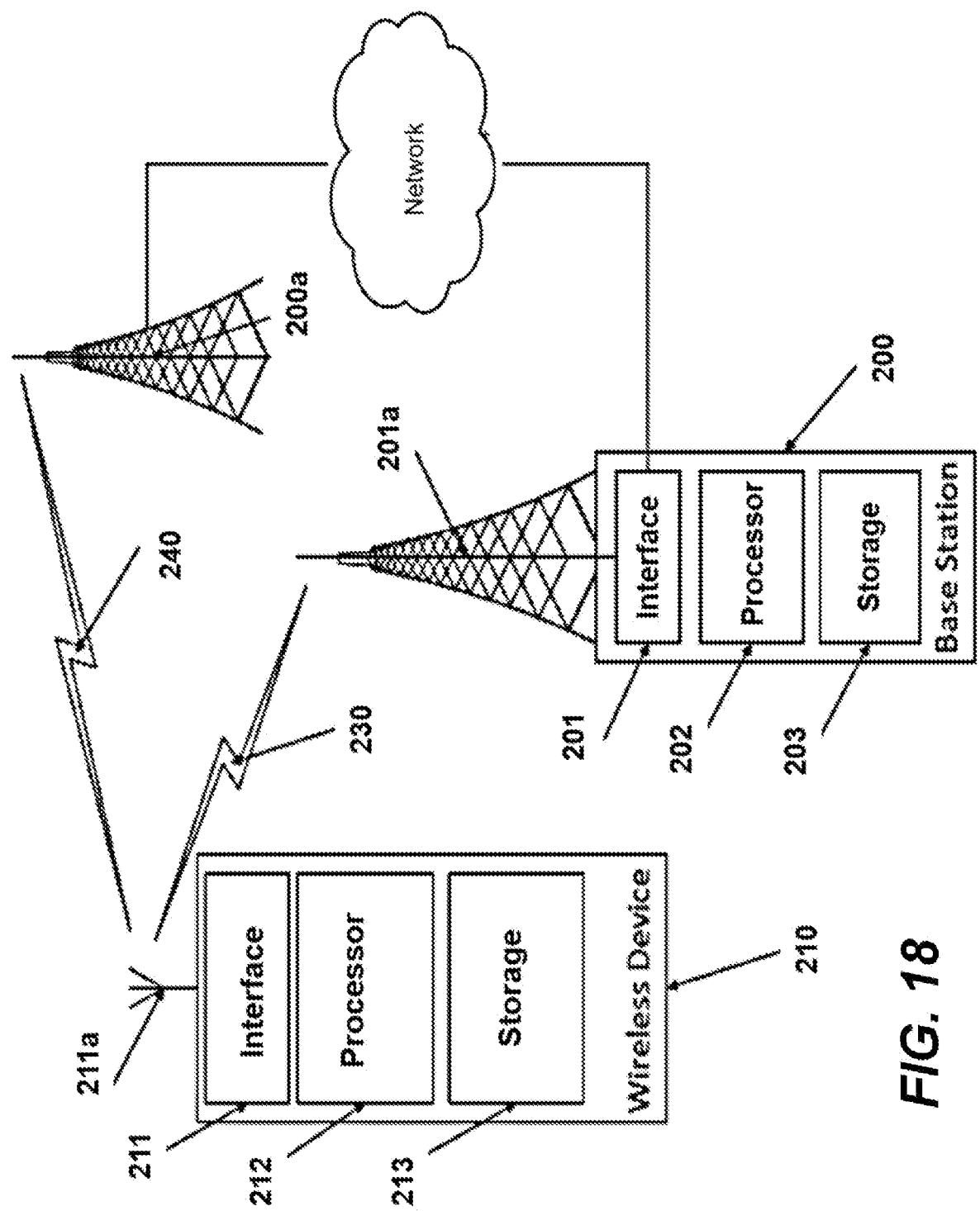
FIG. 18 is a block diagram illustrating an example of a network, in accordance with certain embodiments.

Although the solutions described above may be implemented in any appropriate type of system using any suitable components, particular embodiments of the described solutions may be implemented in a wireless network such as the example wireless communication network illustrated in FIG. 18. In the example embodiment of FIG. 18, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 18 illustrates a wireless network comprising a more detailed view of network node 200 and wireless device (WD) 210, in accordance with a particular embodiment. For simplicity, FIG. 18 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multistandard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 18, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g., refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 18, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 19:
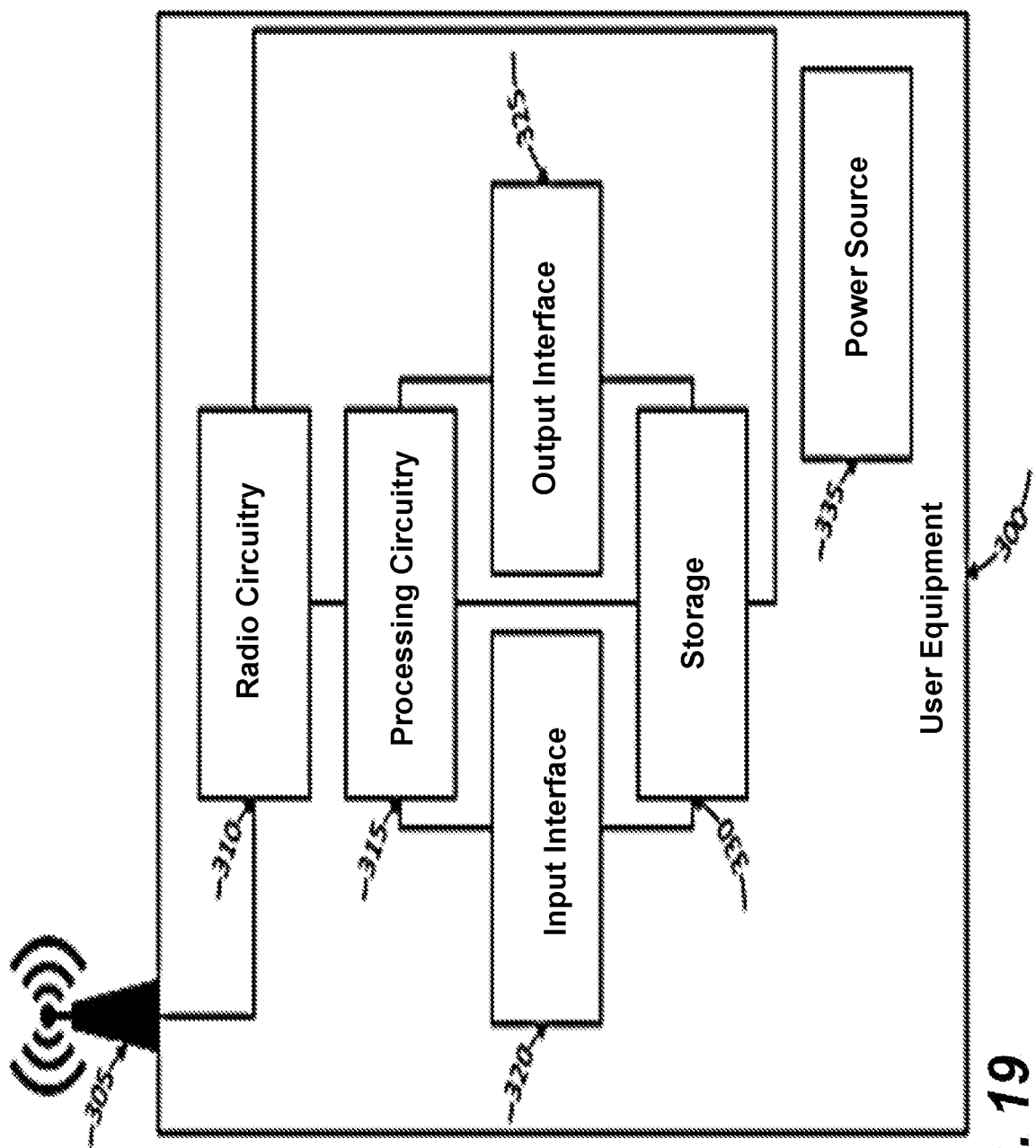
FIG. 19 is a block diagram illustrating an example of a UE, in accordance with certain embodiments.

As shown in FIG. 19, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 19 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 20:
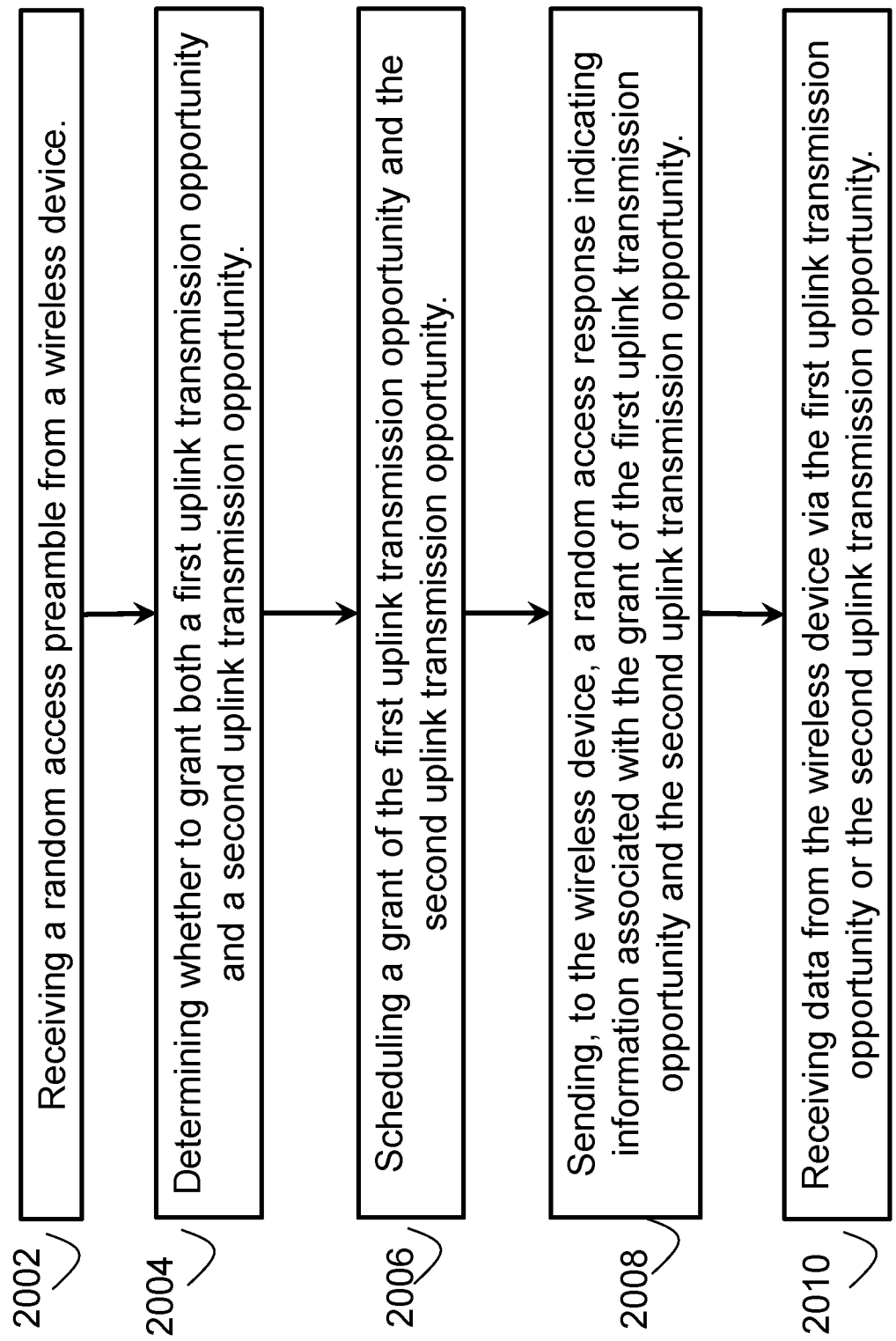
FIG. 20 is a flow chart illustrating an example of a method that may be implemented in a network node, in accordance with certain embodiments.

FIG. 20 illustrates an example of a method that may be performed in a network node, such as the network node 200 described with respect to FIG. 18, in accordance with certain embodiments. As an example, network node 200 may comprise processing circuitry (e.g., one or more processors 202) and logic (e.g., logic may comprise computer readable program code which may be stored in memory, such as storage 203) that, when executed by the processing circuitry, causes the network node to perform the random access procedure of FIG. 20.

At step 2002, the method comprises receiving a random access preamble from a wireless device, such as wireless device 210 of FIG. 18 or UE 300 of FIG. 19. In certain embodiments, the method proceeds to step 2004 with determining whether or not to grant both a first uplink transmission opportunity and a second uplink transmission opportunity. Examples of information that may be used in determining whether or not to grant both a first uplink transmission opportunity and a second uplink transmission opportunity are described above with respect to FIG. 3 (see e.g., the discussion of Step 1: Msg1 reception and eNB decision on dual grant).

At step 2006, the method comprises scheduling a grant of the first uplink transmission opportunity and second uplink transmission opportunity. In certain embodiments, the second uplink transmission opportunity allows more uplink data to be transmitted prior to completing the random access procedure than the first uplink transmission opportunity. For example, in certain embodiments, the second uplink transmission opportunity allows more uplink data to be transmitted in message 3 of the random access procedure than the first uplink transmission opportunity. In certain embodiments, wireless resources scheduled for the first uplink transmission opportunity overlap wireless resources scheduled for the second uplink transmission opportunity.

At step 2008, the method comprises sending a random access response to the wireless device. The random access response indicates information associated with the grant of the first uplink transmission opportunity and second uplink transmission opportunity. Examples of information that may be sent in a random access response are described above with respect to FIG. 3 (see e.g., Step 2: Transmission of msg2 including the dual grant). In certain embodiments, the random access procedure is backward compatible with a random access procedure according to 3GPP Release 14 or earlier. For example, the random access response can be formatted such that a wireless device interpreting the random access response according to 3GPP Release 14 or earlier ignores the grant of the second uplink transmission opportunity. In certain embodiments, the random access response indicates a transport block size for the second uplink transmission opportunity. In certain embodiments, the random access response comprises an explicit indication that a second uplink transmission opportunity has been granted. In certain embodiments, the random access response comprises the grant of the first uplink transmission opportunity and an indication that the grant of the second uplink transmission opportunity is being sent in another message. In certain embodiments, the random access response comprises the grant of the first uplink transmission opportunity and the second uplink transmission opportunity embedded in the random access response.

At step 2010, the method comprises receiving data from the wireless device via the first uplink transmission opportunity or the second uplink transmission opportunity. An example is described above with respect to FIG. 3 (see e.g., Step 5. Reception of msg3). In certain embodiments, the data is received via the second uplink transmission opportunity before the random access procedure has completed. In certain embodiments, the grant of the second uplink transmission opportunity allows the network node to receive more data from the wireless device before the random access procedure has completed (e.g., via Msg3) than was possible in 3GPP Release 14 or earlier.

Figure 21:
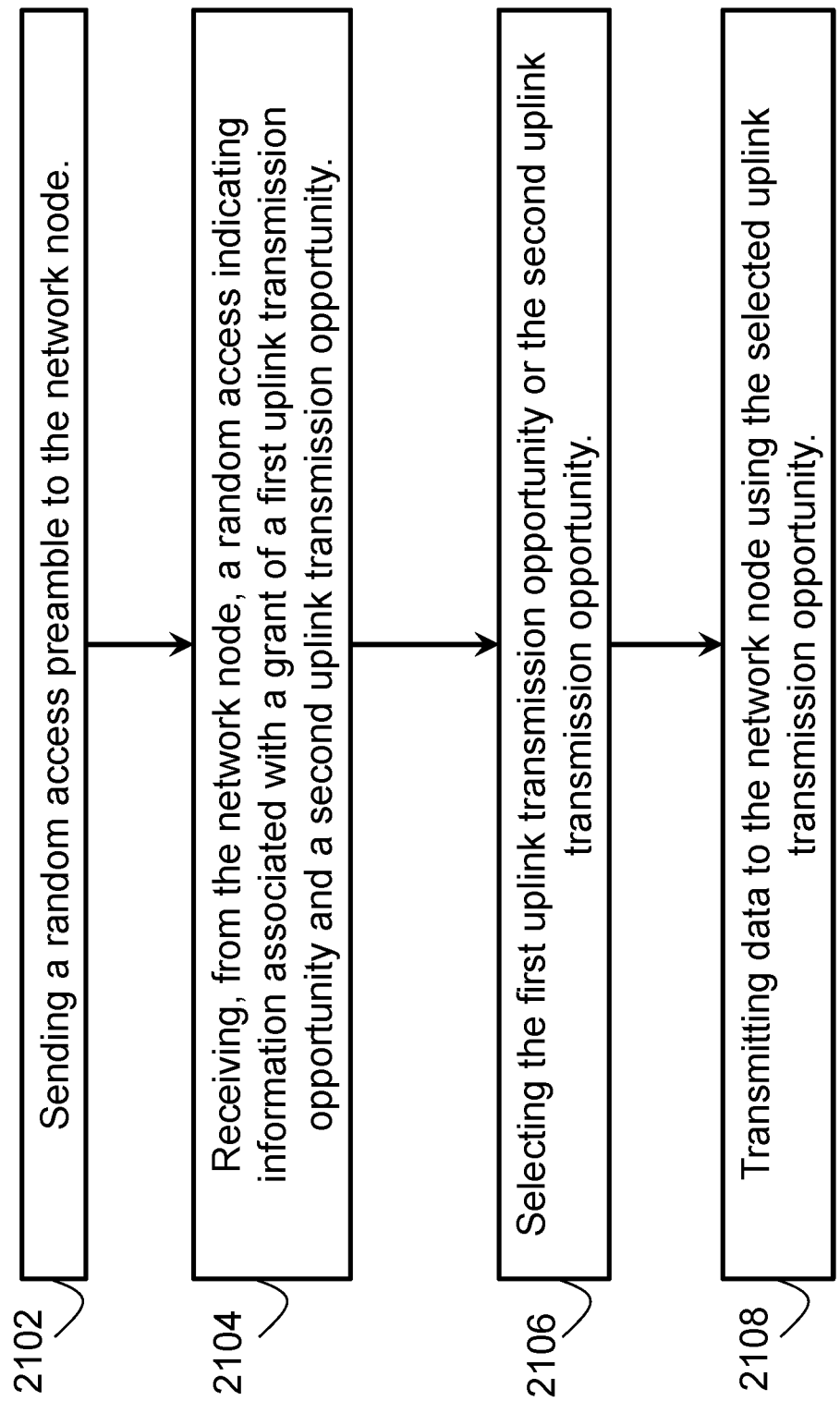
FIGS. 21-22 are flow charts illustrating examples of methods that may be implemented in a wireless device, in accordance with certain embodiments.
Figure 22:
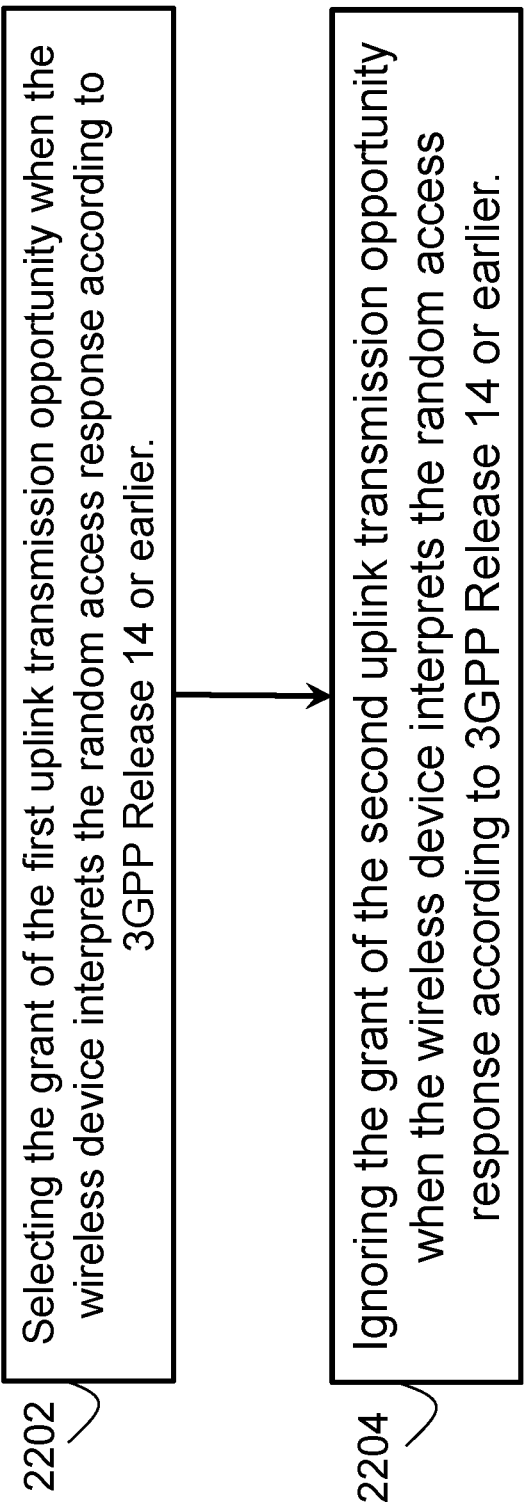

FIGS. 21-22 illustrates examples of a method that may be performed in a wireless device, such as the wireless device 210 described with respect to FIG. 18 or the UE 300 described with respect to FIG. 19. As an example, wireless device 210 may comprise processing circuitry (e.g., one or more processors 212) and logic (e.g., logic may comprise computer readable program code which may be stored in memory, such as storage 213) that, when executed by the processing circuitry, causes the wireless device to perform the random access procedure of FIGS. 21 and/or 22. Similarly, UE 300 may comprise processing circuitry 315 and logic (e.g., logic may comprise computer readable program code which may be stored in memory, such as storage 330) that, when executed by the processing circuitry, causes the UE to perform the random access procedure of FIGS. 21 and/or 22. In certain embodiments, the random access procedure performed by the wireless device (e.g., wireless device 210 or UE 300) is backward compatible with a random access procedure according to 3GPP Release 14 or earlier The method of FIG. 21 begins at step 2102 with sending a random access preamble to a network node, such as network node 200 described with respect to FIG. 18. The method proceeds to step 2104 with receiving a random access response from the network node. The random access response indicates information associated with a grant of a first uplink transmission opportunity and second uplink transmission opportunity. An example is described above with respect to FIG. 3 (see e.g., Step 3. Reception of msg2). In certain embodiments, the random access response indicates a transport block size for the second uplink transmission opportunity. In certain embodiments, the random access response comprises an explicit indication that a second uplink transmission opportunity has been granted. In certain embodiments, the random access response comprises the grant of the first uplink transmission opportunity and an indication that the grant of the second uplink transmission opportunity is being sent in another message. In certain embodiments, the random access response comprises the grant of the first uplink transmission opportunity and the second uplink transmission opportunity embedded in the random access response. In certain embodiments, the random access response indicates that wireless resources scheduled for the first uplink transmission opportunity overlap wireless resources scheduled for the second uplink transmission opportunity.

At step 2106, the method comprises selecting the first uplink transmission opportunity or the second uplink transmission opportunity. In certain embodiments, the selection is performed based on the configuration or capabilities of the wireless device. For example, FIG. 22 illustrates an example embodiment in which the wireless device interprets the random access response according to 3GPP Release 14 or earlier. In the example embodiment, the wireless device selects the grant of the first uplink transmission opportunity (step 2202) and ignores the grant of the second uplink transmission opportunity (step 2204). In certain embodiments, the selection in step 2106 is performed dynamically based on resource availability, eNB load, etc. As an example, in certain embodiments, the second uplink transmission opportunity allows more uplink data to be transmitted prior to completing the random access procedure than the first uplink transmission opportunity (e.g., the second uplink transmission opportunity allows more uplink data to be transmitted in message 3 of the random access procedure than the first uplink transmission opportunity). Thus, the wireless device may select the second uplink transmission opportunity in order to transmit more data prior to completing the random access procedure.

The method proceeds to step 2108 with transmitting data to the network node using the selected uplink transmission opportunity. That is, if in step 2106 the first uplink transmission opportunity was selected, then step 2108 comprises transmitting the data using the first uplink transmission opportunity. If in step 2106 the second uplink transmission opportunity was selected, then step 2108 comprises transmitting the data using the second uplink transmission opportunity. An example is described above with respect to FIG. 3 (see e.g., Step 4. Transmission of msg3). In certain embodiments, step 2108 comprises transmitting the data to the network node via the second uplink transmission opportunity before the random access procedure has completed (e.g., transmitting the data in Msg3). In certain embodiments, transmitting the data via the second uplink transmission opportunity allows the wireless device to send more data before the random access procedure has completed (e.g., via Msg3) than was possible in 3GPP Release 14 or earlier.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method implemented in a network node, the method comprising:
transmitting system information, the system information comprising information that defines a second uplink transmission opportunity as a function of a grant of a first uplink transmission opportunity;
receiving a random access preamble from a wireless device;
scheduling the grant of the first uplink transmission opportunity;
sending a random access response to the wireless device, the random access response indicating one or more wireless resources scheduled in the grant of the first uplink transmission opportunity; and
receiving data from the wireless device via the first uplink transmission opportunity or the second uplink transmission opportunity.

2. A network node comprising processing circuitry and logic that, when executed by the processing circuitry, causes the network node to:
transmit system information, the system information comprising information that defines a second uplink transmission opportunity as a function of a grant of a first uplink transmission opportunity;
receive a random access preamble from a wireless device;
schedule the grant of the first uplink transmission opportunity;
send a random access response to the wireless device, the random access response indicating one or more wireless resources scheduled in the grant of the first uplink transmission opportunity; and
receive data from the wireless device via the first uplink transmission opportunity or the second uplink transmission opportunity.

3. The network node of claim 2, wherein:
the random access response indicates a transport block size for the one or more wireless resources scheduled in the grant of the first uplink transmission opportunity; and
the information that defines the second uplink transmission opportunity as the function of the grant of the first uplink transmission opportunity indicates to define a transport block size of the second uplink transmission opportunity as a multiplication or step of the transport block size of the first uplink transmission opportunity.

4. The network node of claim 2, wherein the random access response is backward compatible with a long term evolution (LTE) random access procedure according to third generation partnership project (3GPP) Release 14 or earlier.

5. The network node of claim 2, wherein the random access response is formatted such that a Medium Access Control Random Access Response Protocol Data Unit (MAC RAR PDU) according to 3GPP Release 14 or earlier stays intact.

6. The network node of claim 2, wherein the second uplink transmission opportunity allows more uplink data to be transmitted prior to completing a random access procedure than the first uplink transmission opportunity.

7. The network node of claim 2, wherein the second uplink transmission opportunity allows more uplink data to be transmitted in message 3 of the random access procedure than the first uplink transmission opportunity.

8. The network node of claim 2, wherein the data is received via the second uplink transmission opportunity before the random access procedure has completed.

9. The network node of claim 2, the network node further configured to determine whether or not to grant both the first uplink transmission opportunity and the second uplink transmission opportunity.

10. The network node of claim 2, wherein the random access response comprises an explicit indication that the second uplink transmission opportunity has been granted.

11. The network node of claim 2, wherein the information that defines the second uplink transmission opportunity as the function of the grant of the first uplink transmission opportunity comprises a multiplication factor or a step size that enables the wireless device to determine a transport block size of the second uplink transmission opportunity based on a transport block size of the first uplink transmission opportunity.

12. The network node of claim 2, further comprising:
sending the wireless device an early data indication comprising a multiplication factor or a step size that enables the wireless device to determine a transport block size of the second uplink transmission opportunity based on a transport block size of the first uplink transmission opportunity.

13. The network node of claim 2 wherein at least one of the one or more wireless resources scheduled for the first uplink transmission opportunity overlaps at least one of one or more wireless resources scheduled for the second uplink transmission opportunity.

14. A method implemented in a wireless device, the method comprising:
receiving system information from a network node, the system information comprising information that defines a second uplink transmission opportunity as a function of a grant of a first uplink transmission opportunity;
sending a random access preamble to the network node;
receiving a random access response from the network node, the random access response indicating one or more wireless resources scheduled in the grant of the first uplink transmission opportunity;
determining one or more wireless resources scheduled in the grant of the second uplink transmission opportunity based on the system information and the random access response received from the network node;
selecting the first uplink transmission opportunity or the second uplink transmission opportunity; and
transmitting data to the network node using the selected uplink transmission opportunity.

15. A wireless device comprising processing circuitry and logic that, when executed by the processing circuitry, causes the wireless device to:
receive system information from a network node, the system information comprising information that defines a second uplink transmission opportunity as a function of a grant of a first uplink transmission opportunity;
send a random access preamble to the network node;
receive a random access response from the network node, the random access response indicating one or more wireless resources scheduled in the grant of the first uplink transmission opportunity;
determine one or more wireless resources scheduled in the grant of the second uplink transmission opportunity based on the system information and the random access response received from the network node;
selecting the first uplink transmission opportunity or the second uplink transmission opportunity; and
transmitting data to the network node using the selected uplink transmission opportunity.

16. The wireless device of claim 15, wherein:
the random access response indicates a transport block size for the one or more wireless resources scheduled in the grant of the first uplink transmission opportunity; and
the information that defines the second uplink transmission opportunity as the function of the grant of the first uplink transmission opportunity indicates to define a transport block size of the second uplink transmission opportunity as a multiplication or step of the transport block size of the first uplink transmission opportunity.

17. The wireless device of claim 15, wherein the random access response is backward compatible with a long term evolution (LTE) random access procedure according to third generation partnership project (3GPP) Release 14 or earlier.

18. The wireless device of claim 15, wherein to select the first uplink transmission opportunity or the second uplink transmission opportunity, the wireless device is configured to:
select the grant of the first uplink transmission opportunity when the wireless device interprets the random access response according to 3GPP Release 14 or earlier; and
ignore the grant of the second uplink transmission opportunity when the wireless device interprets the random access response according to 3GPP Release 14 or earlier.

19. The wireless device of claim 15, wherein:
the second uplink transmission opportunity allows more uplink data to be transmitted prior to completing a random access procedure than the first uplink transmission opportunity; and
to transmit the data to the network node, the wireless device is configured to transmit the data via the second uplink transmission opportunity before the random access procedure has completed.

20. The wireless device of claim 15 wherein:
the second uplink transmission opportunity allows more uplink data to be transmitted in message 3 of the random access procedure than the first uplink transmission opportunity; and
to transmit the data to the network node, the wireless device is configured to transmit the data via the second uplink transmission opportunity in message 3 of the random access procedure.

21. The wireless device of claim 15, wherein the random access response comprises an explicit indication that the second uplink transmission opportunity has been granted.

22. The wireless device of claim 15, wherein the information that defines the second uplink transmission opportunity as the function of the grant of the first uplink transmission opportunity comprises a multiplication factor or a step size that enables the wireless device to determine a transport block size of the second uplink transmission opportunity based on a transport block size of the first uplink transmission opportunity.

23. The wireless device of claim 15, further comprising:
receiving an early data indication from the network node, the early data indication comprising a multiplication factor or a step size that enables the wireless device to determine a transport block size of the second uplink transmission opportunity based on a transport block size of the first uplink transmission opportunity.

24. The wireless device of claim 15, wherein at least one of the one or more wireless resources scheduled for the first uplink transmission opportunity overlaps at least one of the one or more wireless resources scheduled for the second uplink transmission opportunity.

* * * * *